(12) United States Patent
Deninger et al.

(10) Patent No.: US 7,962,591 B2
(45) Date of Patent: Jun. 14, 2011

(54) OBJECT CLASSIFICATION IN A CAPTURE SYSTEM

(75) Inventors: William Deninger, San Jose, CA (US); Erik de la Iglesia, Mountain View, CA (US)

(73) Assignee: McAfee, Inc., Santa Clara, CA (US)

( * ) Notice: Subject to any disclaimer, the term of this patent is extended or adjusted under 35 U.S.C. 154(b) by 1089 days.

(21) Appl. No.: 10/876,205

(22) Filed: Jun. 23, 2004

(65) Prior Publication Data
US 2005/0289181 A1 Dec. 29, 2005

(51) Int. Cl.
*G06F 15/16* (2006.01)
(52) U.S. Cl. ........................................ 709/223; 709/224
(58) Field of Classification Search .......... 709/223–224; 715/513
See application file for complete search history.

(56) References Cited

U.S. PATENT DOCUMENTS

| | | | |
|---|---|---|---|
| 4,286,255 A | 8/1981 | Siy | |
| 4,710,957 A * | 12/1987 | Bocci et al. | 380/42 |
| 5,249,289 A | 9/1993 | Thamm et al. | |
| 5,465,299 A | 11/1995 | Matsumoto et al. | |
| 5,479,654 A | 12/1995 | Squibb | |
| 5,497,489 A | 3/1996 | Menne | |
| 5,542,090 A | 7/1996 | Henderson et al. | |
| 5,557,747 A | 9/1996 | Rogers et al. | |
| 5,623,652 A | 4/1997 | Vora et al. | |
| 5,768,578 A | 6/1998 | Kirk | |
| 5,781,629 A | 7/1998 | Haber et al. | |
| 5,794,052 A | 8/1998 | Harding | |
| 5,813,009 A | 9/1998 | Johnson et al. | |
| 5,943,670 A | 8/1999 | Prager | |
| 5,995,111 A | 11/1999 | Morioka et al. | |
| 6,026,411 A | 2/2000 | Delp | |
| 6,078,953 A | 6/2000 | Vaid et al. | |
| 6,094,531 A | 7/2000 | Allison et al. | |
| 6,108,697 A | 8/2000 | Raymond et al. | |
| 6,161,102 A | 12/2000 | Yanagilhara et al. | |
| 6,175,867 B1 | 1/2001 | Taghadoss | |
| 6,192,472 B1 | 2/2001 | Garay et al. | |
| 6,243,091 B1 | 6/2001 | Berstis | |
| 6,243,720 B1 | 6/2001 | Munter et al. | |
| 6,278,992 B1 | 8/2001 | Curtis et al. | |
| 6,292,810 B1 | 9/2001 | Richards | |
| 6,336,186 B1 | 1/2002 | Dyksterhouse et al. | |
| 6,356,885 B2 | 3/2002 | Ross et al. | |
| 6,389,419 B1 | 5/2002 | Wong et al. | |
| 6,408,294 B1 | 6/2002 | Getchius et al. | |

(Continued)

OTHER PUBLICATIONS

Ethereal. Computer program product for analyzing network traffic. http://web.archive.org/web/20030315045117/www.ethereal.com/distribution/docs/user-guide.pdf?cf0A706609=410597E7DIVVNQVE9cd25vb25hbjpudGxtOk2RaYE4B48uKDeGfG9GVuk=.*

(Continued)

*Primary Examiner* — Kenny S Lin
*Assistant Examiner* — Shripal K Khajuria
(74) *Attorney, Agent, or Firm* — Patent Capital Group (57) ABSTRACT

Objects can be extracted from data flows captured by a capture device. Each captured object can then be classified according to content. In one embodiment, the present invention includes determining whether a captured object is binary or textual in nature, and classifying the captured object as one of a plurality of textual content types based tokens found in the captured object if the captured object is determined to be textual in nature.

23 Claims, 7 Drawing Sheets

U.S. PATENT DOCUMENTS

| | | |
|---|---|---|
| 6,408,301 B1 | 6/2002 | Patton et al. |
| 6,457,017 B2 | 9/2002 | Watkins et al. |
| 6,493,761 B1* | 12/2002 | Baker et al. .................. 709/230 |
| 6,499,105 B1 | 12/2002 | Yoshiura et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,571,275 B1 | 5/2003 | Dong et al. |
| 6,598,033 B2 | 7/2003 | Ross et al. |
| 6,662,176 B2 | 12/2003 | Brunet et al. |
| 6,691,209 B1 | 2/2004 | O'Connell |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,978,297 B1 | 12/2005 | Piersol |
| 7,020,654 B1 | 3/2006 | Najmi |
| 7,020,661 B1 | 3/2006 | Cruanes et al. |
| 7,062,572 B1 | 6/2006 | Hampton |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,130,587 B2 | 10/2006 | Hikokubo et al. |
| 7,158,983 B2 | 1/2007 | Willse et al. |
| 7,185,073 B1 | 2/2007 | Gai et al. |
| 7,185,192 B1 | 2/2007 | Kahn |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,266,845 B2 | 9/2007 | Hypponen |
| 7,277,957 B2 | 10/2007 | Rowley et al. |
| 7,290,048 B1 | 10/2007 | Barnett et al. |
| 7,293,067 B1 | 11/2007 | Maki et al. |
| 7,293,238 B1 | 11/2007 | Brook et al. |
| 7,296,070 B2 | 11/2007 | Sweeney et al. |
| 7,296,088 B1 | 11/2007 | Padmanabhan et al. |
| 7,299,277 B1 | 11/2007 | Moran et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,505,463 B2 | 3/2009 | Schuba et al. |
| 7,506,055 B2 | 3/2009 | McClain et al. |
| 7,509,677 B2 | 3/2009 | Saurabh et al. |
| 7,516,492 B1 | 4/2009 | Nisbet et al. |
| 7,551,629 B2 | 6/2009 | Chen et al. |
| 7,596,571 B2 | 9/2009 | Sifry |
| 7,664,083 B1 | 2/2010 | Cermak et al. |
| 7,760,730 B2 | 7/2010 | Goldschmidt et al. |
| 7,760,769 B1 | 7/2010 | Lovett et al. |
| 2001/0032310 A1 | 10/2001 | Corella |
| 2001/0037324 A1 | 11/2001 | Agrawal et al. |
| 2001/0046230 A1 | 11/2001 | Rojas |
| 2002/0032677 A1 | 3/2002 | Morgenthaler et al. |
| 2002/0052896 A1 | 5/2002 | Streit et al. |
| 2002/0078355 A1 | 6/2002 | Samar |
| 2002/0091579 A1 | 7/2002 | Yehia et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0129140 A1* | 9/2002 | Peled et al. .................. 709/224 |
| 2002/0159447 A1 | 10/2002 | Carey et al. |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105739 A1 | 6/2003 | Essafi et al. |
| 2003/0131116 A1 | 7/2003 | Jain et al. |
| 2003/0135612 A1 | 7/2003 | Huntington |
| 2003/0185220 A1 | 10/2003 | Valenci |
| 2003/0196081 A1 | 10/2003 | Savarda et al. |
| 2003/0204741 A1* | 10/2003 | Schoen et al. ................. 713/200 |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2003/0233411 A1 | 12/2003 | Parry et al. |
| 2004/0054779 A1 | 3/2004 | Takeshima et al. |
| 2004/0059736 A1 | 3/2004 | Willse et al. |
| 2004/0071164 A1 | 4/2004 | Baum |
| 2004/0111678 A1 | 6/2004 | Hara |
| 2004/0114518 A1 | 6/2004 | MacFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0181513 A1 | 9/2004 | Henderson et al. |
| 2004/0181690 A1 | 9/2004 | Rothermel et al. |
| 2004/0194141 A1 | 9/2004 | Sanders |
| 2004/0196970 A1 | 10/2004 | Cole |
| 2004/0230572 A1 | 11/2004 | Omoigui |
| 2004/0267753 A1 | 12/2004 | Hoche |
| 2005/0004911 A1 | 1/2005 | Goldberg et al. |
| 2005/0021715 A1* | 1/2005 | Dugatkin et al. ............. 709/223 |
| 2005/0021743 A1* | 1/2005 | Fleig et al. .................... 709/224 |
| 2005/0022114 A1* | 1/2005 | Shanahan et al. ............. 715/513 |
| 2005/0027881 A1 | 2/2005 | Figueira et al. |
| 2005/0033747 A1 | 2/2005 | Wittkotter |
| 2005/0033803 A1 | 2/2005 | Vleet et al. |
| 2005/0038809 A1 | 2/2005 | Abajian et al. |
| 2005/0050205 A1* | 3/2005 | Gordy et al. .................. 709/227 |
| 2005/0055327 A1 | 3/2005 | Agrawal et al. |
| 2005/0055399 A1* | 3/2005 | Savchuk ....................... 709/203 |
| 2005/0075103 A1 | 4/2005 | Hikokubo et al. |
| 2005/0091443 A1 | 4/2005 | Hershkovich et al. |
| 2005/0091532 A1 | 4/2005 | Moghe |
| 2005/0097441 A1 | 5/2005 | Herbach et al. |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138242 A1 | 6/2005 | Pope et al. |
| 2005/0138279 A1 | 6/2005 | Somasundaram |
| 2005/0149504 A1* | 7/2005 | Ratnaparkhi .................... 707/3 |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0083180 A1 | 4/2006 | Baba et al. |
| 2006/0150249 A1 | 7/2006 | Gassen et al. |
| 2006/0167896 A1 | 7/2006 | Kapur et al. |

| | | |
|---|---|---|
| 2006/0184532 A1 | 8/2006 | Hamada et al. |
| 2006/0242126 A1 | 10/2006 | Fitzhugh |
| 2006/0242313 A1 | 10/2006 | Le et al. |
| 2006/0251109 A1 | 11/2006 | Muller et al. |
| 2006/0272024 A1 | 11/2006 | Huang et al. |
| 2006/0288216 A1 | 12/2006 | Buhler et al. |
| 2007/0006293 A1 | 1/2007 | Balakrishnan et al. |
| 2007/0036156 A1 | 2/2007 | Liu et al. |
| 2007/0050334 A1 | 3/2007 | Deninger et al. |
| 2007/0050381 A1 | 3/2007 | Hu et al. |
| 2007/0050467 A1 | 3/2007 | Borrett et al. |
| 2007/0081471 A1 | 4/2007 | Lovett et al. |
| 2007/0094394 A1 | 4/2007 | Singh et al. |
| 2007/0110089 A1 | 5/2007 | Essafi et al. |
| 2007/0116366 A1 | 5/2007 | Deninger et al. |
| 2007/0136599 A1 | 6/2007 | Suga |
| 2007/0162609 A1 | 7/2007 | Pope et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0271254 A1 | 11/2007 | de la Iglesia et al. |
| 2007/0271371 A1 | 11/2007 | Ahuja et al. |
| 2007/0271372 A1 | 11/2007 | Deninger et al. |
| 2007/0280123 A1 | 12/2007 | Atkins et al. |
| 2008/0028467 A1 | 1/2008 | Kommareddy et al. |
| 2008/0235163 A1 | 9/2008 | Balasubramanian et al. |
| 2009/0300709 A1 | 12/2009 | Chen et al. |
| 2010/0268959 A1 | 10/2010 | Lowe et al. |
| 2011/0004599 A1 | 1/2011 | Deninger et al. |

OTHER PUBLICATIONS

U.S. Appl. No. 12/190,536, filed Aug. 12, 2008, entitled "Configuration Management for a Capture/Registration System," Inventor(s) Jitendra B. Gaitonde et al.

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/410,905, filed Mar. 25, 2009, entitled "System and Method for Managing Data and Policies," Inventor(s) Ratinder Paul Singh Ahuja et al.

Preneel, Bart, "Cryptographic Hash Functions", Proceedings of the $3^{rd}$ Symposium on State and Progress of Research in Cryptography, 1993, pp. 161-171.

U.S. Appl. No. 12/360,537, filed Jan. 27, 2009, entitled "Database for a Capture System," Inventor(s) Rick Lowe et al.

U.S. Appl. No. 11/254,436, filed Oct. 19, 2005, entitled "Attributes of Captured Objects in a Capture System," Inventor(s) William Deninger et al.

U.S. Appl. No. 12/472,150, filed May 26, 2009, entitled "Identifying Image Type in a Capture System," Inventor(s) William Deninger et al.

U.S. Appl. No. 11/900,964, filed Sep. 14, 2007, entitled "System and Method for Indexing a Capture System," Inventor(s) Ashok Doddapaneni et al.

U.S. Appl. No. 12/171,232, filed Jul. 10, 2008, entitled "System and Method for Data Mining and Security Policy Management," Inventor(s) Weimin Liu et al.

Microsoft Outlook, Out look, copyright 1995-2000, 2 pages.

U.S. Appl. No. 12/690,153, filed Jan. 20, 2010, entitled "Query Generation for a Capture System," Inventor(s) Erik de la Iglesia, et al.

U.S. Appl. No. 12/751,876, filed Mar. 31, 2010, entitled "Attributes of Captured Objects in a Capture System," Inventor(s) William Deninger, et al.

U.S. Appl. No. 12/873,061, filed Aug. 31, 2010, entitled "Document Registration," Inventor(s) Ratinder Paul Singh Ahuja, et al.

U.S. Appl. No. 12/939,340, filed Nov. 3, 2010, entitled "System and Method for Protecting Specified Data Combinations," Inventor(s) Ratinder Paul Singh Ahuja, et al.

U.S. Appl. No. 12/967,013, filed Dec. 13, 2010, entitled "Tag Data Structure for Maintaining Relational Data Over Captured Objects," Inventor(s) Erik de la Iglesia, et al.

* cited by examiner

OBJECT CLASSIFICATION IN A CAPTURE SYSTEM

FIELD OF THE INVENTION

The present invention relates to computer networks, and in particular, to a object classification.

BACKGROUND

Computer networks and systems have become indispensable tools for modern business. Modern enterprises use such networks for communications and for storage. The information and data stored on the network of a business enterprise is often a highly valuable asset. Modern enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyse the data leaving the network to monitor for policy violations, and make it possible to track down information leeks. What is needed is a comprehensive system to capture, store, and analyse all data communicated using the enterprises network.

SUMMARY OF THE INVENTION

Objects can be extracted from data flows captured by a capture device. Each captured object can then be classified according to content. In one embodiment, the present invention includes determining whether a captured object is binary or textual in nature, and classifying the captured object as one of a plurality of textual content types based tokens found in the captured object if the captured object is determined to be textual in nature.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
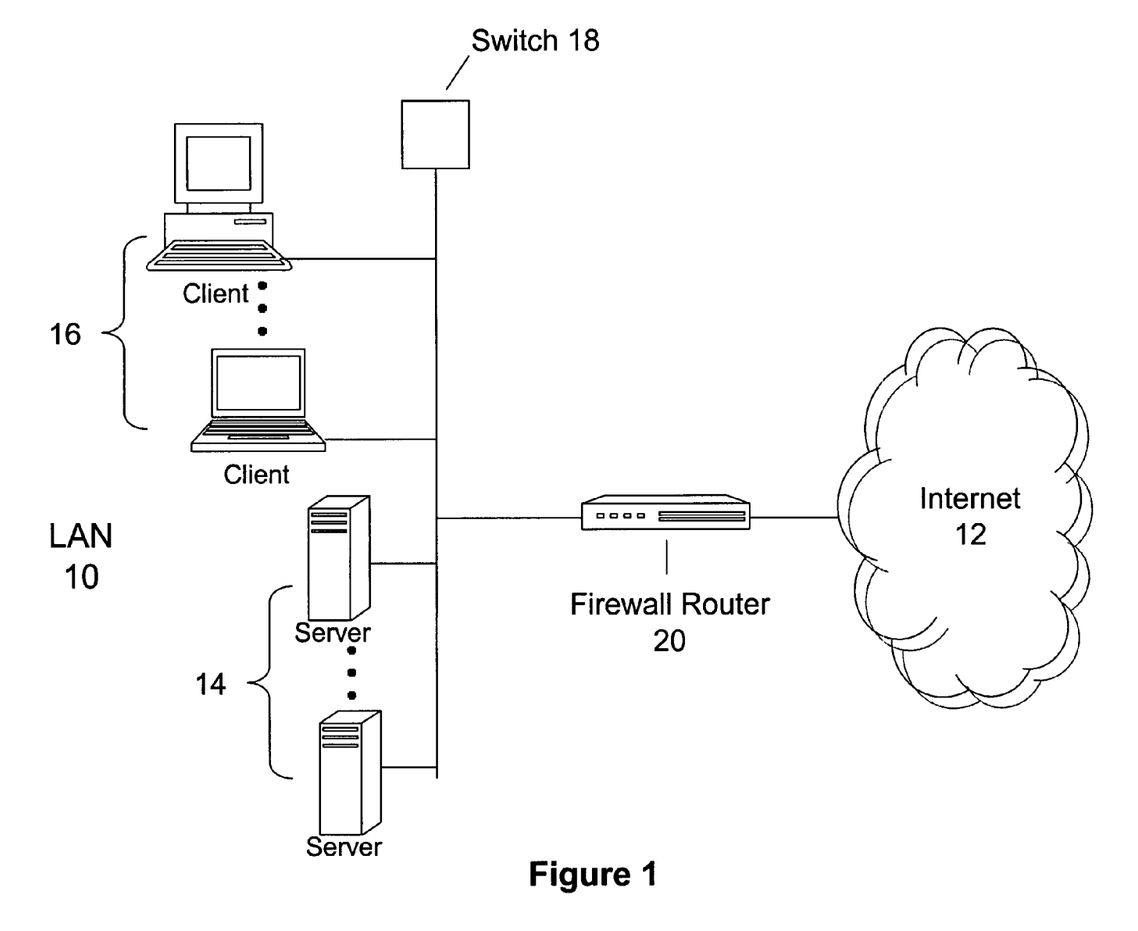
FIG. 1 is a block diagram illustrating a computer network connected to the Internet.

FIG. 1 illustrates a simple prior art configuration of a local area network (LAN) 10 connected to the Internet 12. Connected to the LAN 102 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 12. However, there the router 20 merely forwards packets to the Internet 12. The router 20 cannot capture, analyse, and searchably store the content contained in the forwarded packets.

Figure 2:
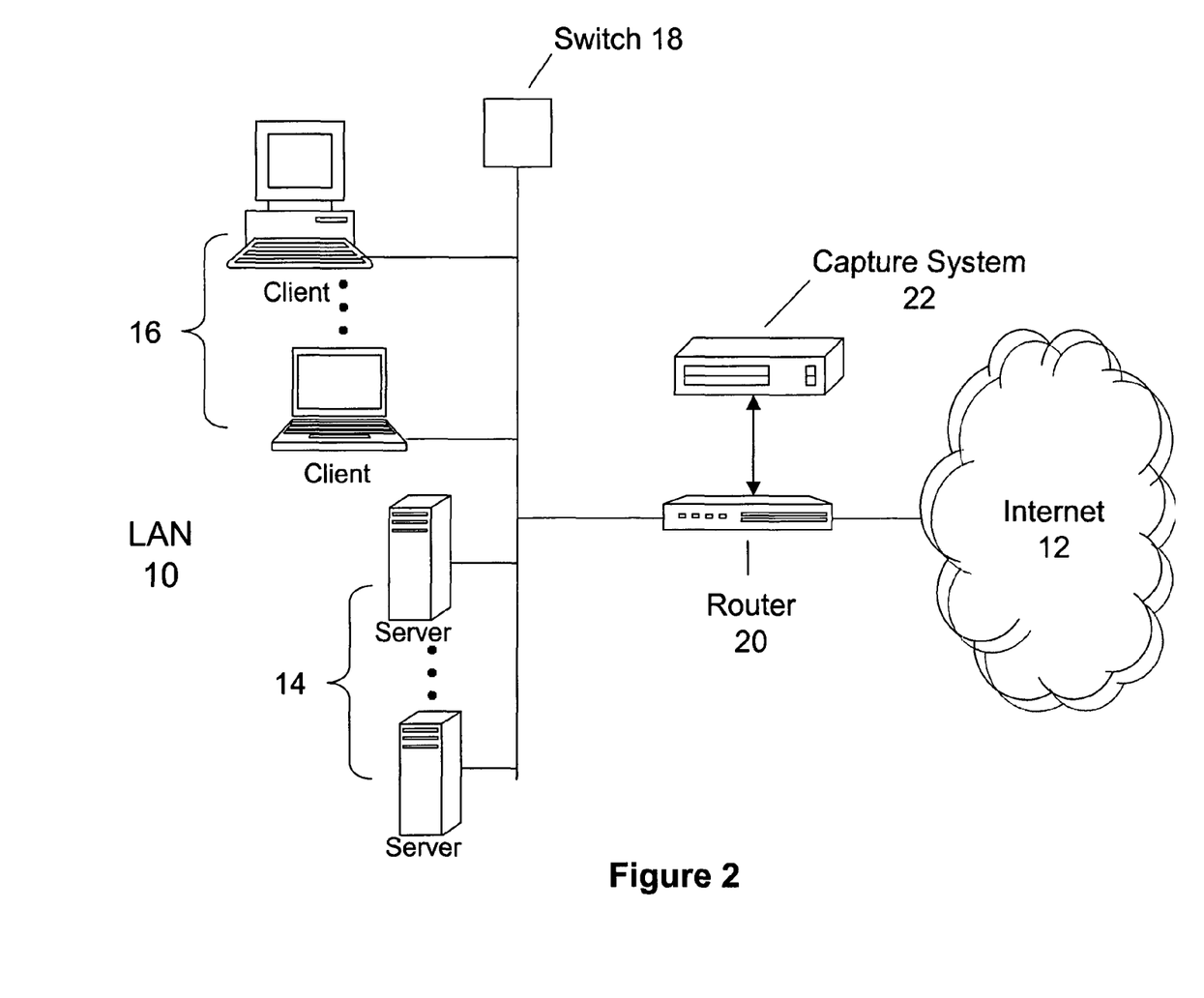
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 12 splits the outgoing data stream, and forwards one copy to the Internet 12 and the other copy to the capture system 22.

There are various other possible configurations. For example, the router 12 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 12 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
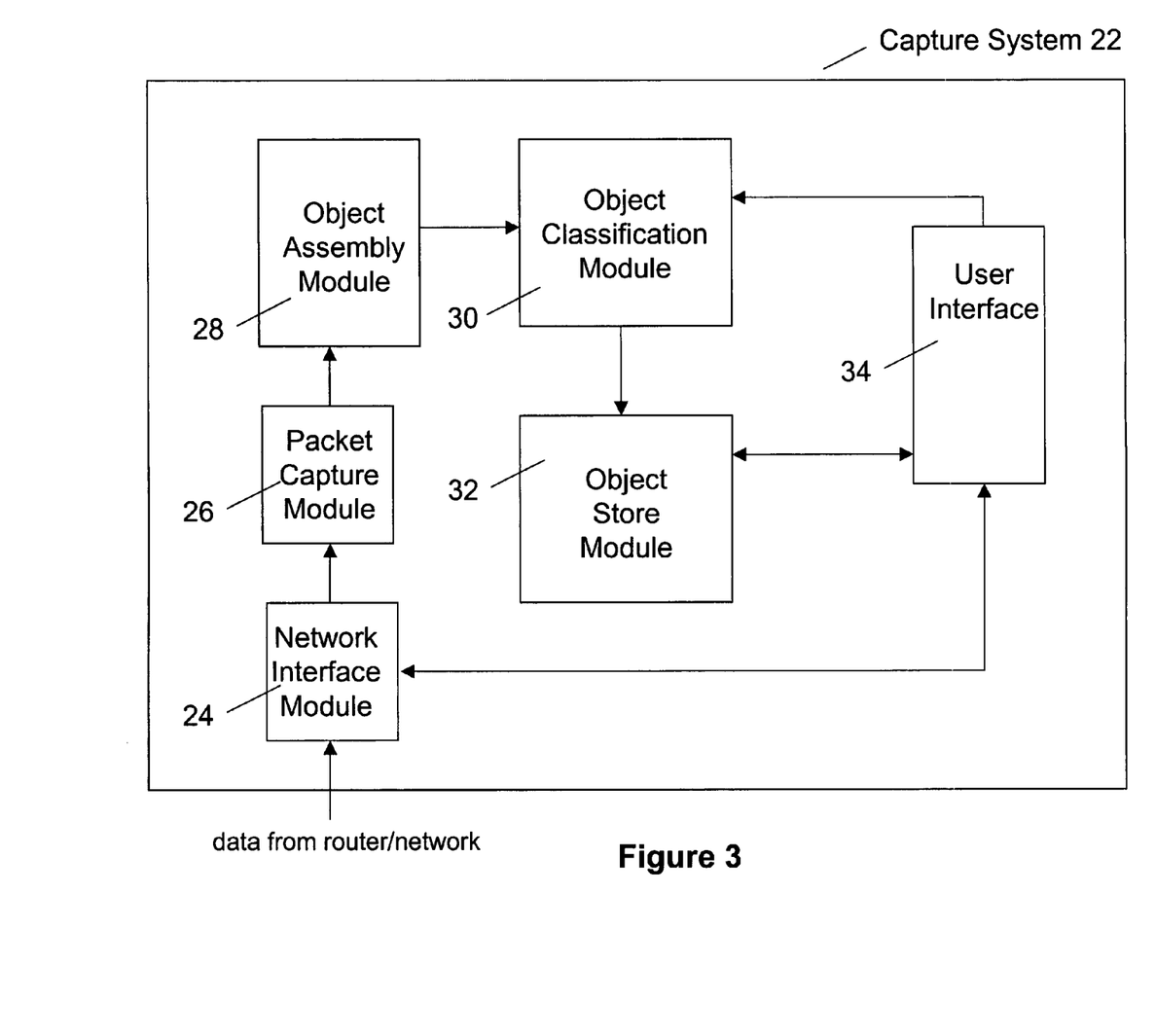
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
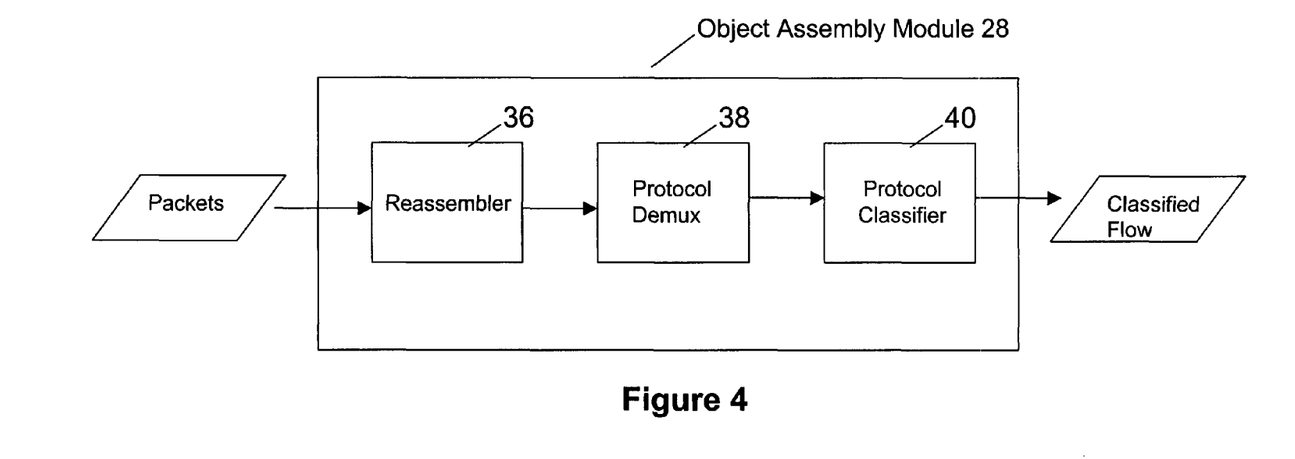
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If now finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the ressembler 36. Thus, in one embodiment, a flow is an ordered data stream of a single communication between a source and a destination.

The flown assembled by the reassember 36 can then be provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means. Several embodiments of the object classification module 30 are described in more detail further below.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment the default capture rule implemented by the object classification module 30 captures all objects leaving the network 10.

Figure 5:
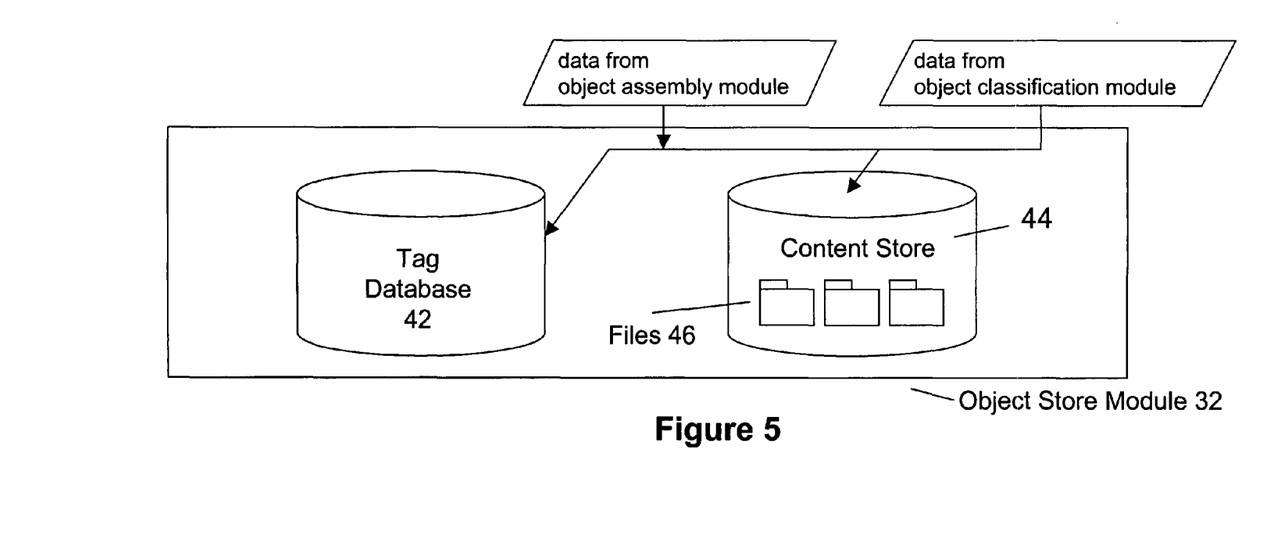
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

Tag Data Structure

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44 and contains relevant information about the stored object. An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |

TABLE 1-continued

| Field Name | Definition |
| --- | --- |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database, and a tag need not be a record. Any data structure capable of indexing an object by storing relational data over the object can be used as a tag data structure. Furthermore, the word "tag" is merely descriptive, other names such as "index" or "relational data store," would be equally descriptive, as would any other designation performing similar functionality.

The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labelled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The signature contained in the Signature and Tag Signature fields can be any digest or hash over the object, or some portion thereof. In one embodiment, a well-known hash, such as MD5 or SHA1 can be used. In one embodiment, the signature is a digital cryptographic signature. In one embodiment, a digital cryptographic signature is a hash signature that is signed with the private key of the capture system 22. Only the capture system 22 knows its own private key, thus, the integrity of the stored object can be verified by comparing a hash of the stored object to the signature decrypted with the public key of the capture system 22, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

Object Classification

Figure 7:
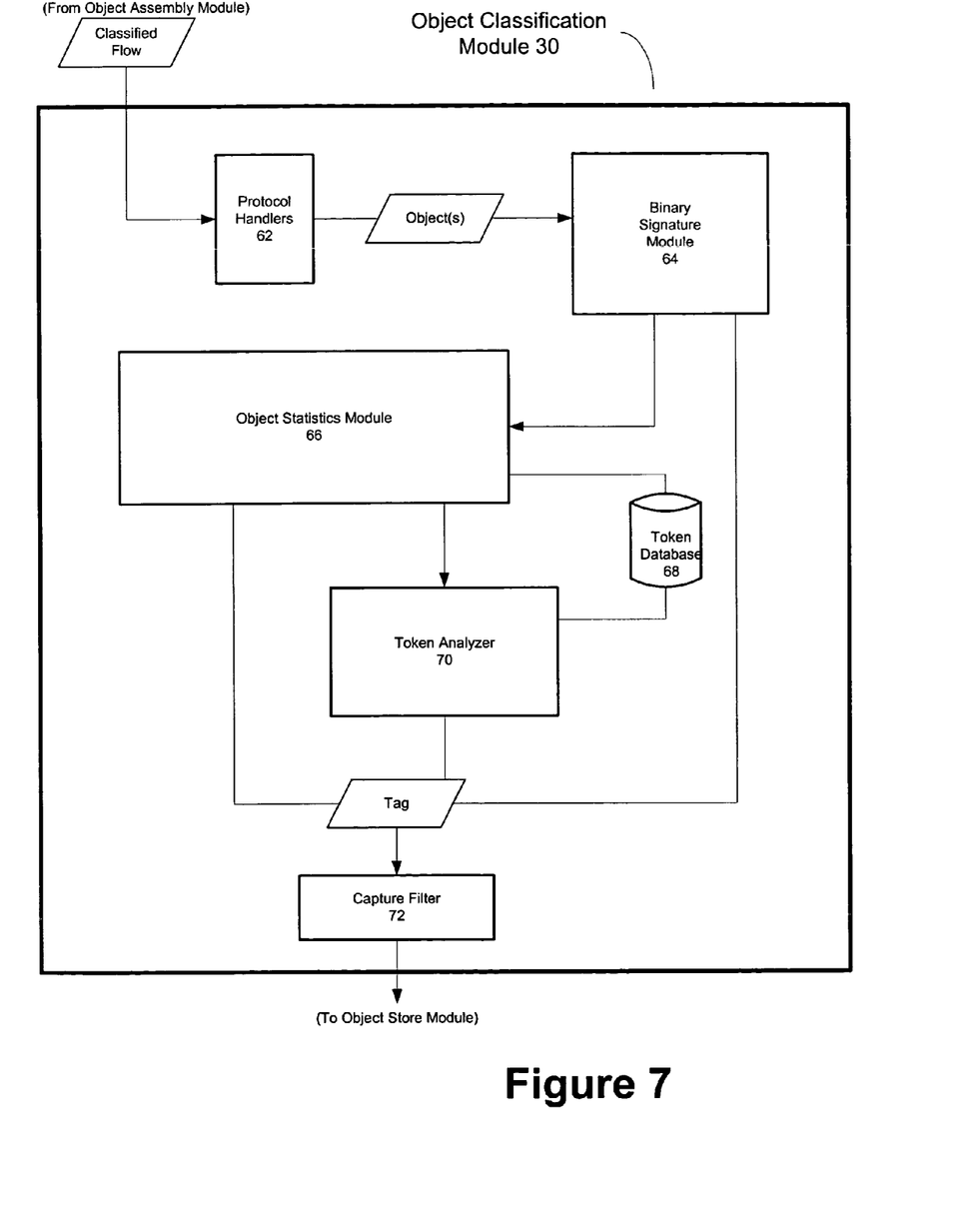
FIG. 7 is a block diagram illustrating an object classification module according to one embodiment of the present invention.

One embodiment of the object classification module 30 is now described in more detail with reference to FIG. 7. As described above, in one embodiment, the output of the object assembly module 28 are flows classified by protocol. In one embodiment, the object classification module 30 includes a number of protocol handlers 62 designed to extract the objects from a classified flow.

For some protocols, such as HTTP, an off-the-shelf protocol handler can be used. For other protocols, the creator of the protocol may provide a protocol handler. Some protocol handlers 62 are designed specially for the capture system 22. In one embodiment, a protocol handlers 62 is included to extract objects from any known transmission protocol, such as HTTP and SMTP. The protocol handlers 62 and object extraction can also be implemented in the object assembly module 28, or in any other module prior to object classification.

Where the object assembly module 28 has been unable to identify the protocol of the flow, the flow is provided to an "unknown protocol handler," included in the list of protocol handlers 62. In one embodiment, the unknown protocol handler extracts the objects contained in the unidentified flow in the absence of a known protocol. In one embodiment, the unknown protocol handler classifies the entire received flow as a single object. For example, classifying the entire unknown flow as one object can address the difficulty associated with classifying FTP data flows. Other embodiments for the operation of the unknown protocol handler are described further below.

In one embodiment, the extracted object (or objects) is input for the binary signature module 64. As explained above, the binary signature module 64 attempts to classify an object based on binary signatures found inside the object. Binary signatures result from the content encapsulating software operating in some unique manner.

Binary signatures may be inserted on purpose of by happenstance. For example, the binary signature of a Bit Torrent object is the string "BitTorrent" seen at the very beginning of the object. Similarly, all Microsoft Office documents begin with a 32-bit Microsoft identifier based on which each office document can be classified. As another example, JPEG images contain the string "JFIF" at the ninth byte of the object, and the twelfth byte of the object is 0x30 in hexadecimal notation.

Binary signatures may be collected from various sources, such as UNIX "Magic Files," or additional research and observation. In one embodiment, the signature database containing the signatures of known content types is updated regularly. Signatures can change or become obsolete, while new signatures may be added to known content types or because of new content types.

In one embodiment, if the binary signature module 64 is able to classify the object by content, then the content classification is inserted into the "Content" field of the tag data structure set forth above. If, however, the binary signature module 64 is unable to classify the object, i.e., the object did not match any known signatures, then the object is provided to the object statistics module 66.

In one embodiment, the object statistics module 66 performs various statistical calculations on the object and reaches one or more conclusions based on the results of these calculations. Specifically, in one embodiment, the object statistics module 66 determines whether the object is binary or textual in nature, if binary, whether it is encrypted, and, if textual, what type of text the object contains.

In one embodiment, one statistical analysis performed by the object statistics module 66 calculates the frequency of the bytes contained in the object. In one embodiment, if all 256 possible bytes occur with statistically even frequency, then the object is processed further as a binary object. If, however, certain bytes associated with textual formats—such as ASCII, extended ASCII, or Unicode—are seen with elevated frequencies, then the object is processed as a text object.

In one embodiment, if the object is determined to be binary data, then the object statistics module 66 performs a distribution analysis (e.g., calculating the variance of the byte distribution) to determine whether the bytes are uniformly distributed or not. In one embodiment, if the bytes are distributed uniformly (to a statistically significant degree), then the object statistics module 66 classifies the object as content type "crypto," i.e., encrypted data, since most encrypted data appears randomized. In one embodiment, if the byte distribution is found to be non-uniform, the object is classified using the catchall "Binary_Unknown" type. The appropriate classification is then inserted into the tag.

In one embodiment, if the object is determined to be text (e.g., ASCII), then the object statistics module 66 accesses a token database 68 to statistically analyze whether and/or how many times each token appears in the object. A token may be a word, a phrase, a part of a word, grammatical notations, patterns, syntax, and any other textual data. Tokens may vary in size, but will generally be relatively small, usually between 3 and 12 bytes in length. The tokens need not be stored in a token database 68, any appropriate storage scheme and data structure can be used.

The statistical information associated with the tokens is provided, in one embodiment, to the token analyzer 70, which classifies the object as one of a number of various text types using the information. Since various textual documents include different types of syntax, grammar, and words, it is possible to classify text objects using such tokens. For example, certain phrases—such as "is a", "the", "and"— appear more regularly in English language text than text in other languages. Similarly, certain tokens—such as "++", "for ("—appear often in certain programming languages.

In one embodiment, the possible textual content types include Englishtext, Frenchtext, Germantext, Spanishtext, Japanesetext, Chinesetext, Koreantext, Russiantext, (i.e., text from any specific language or a catchall Languagetext category) and various programming language, markup language, query language, and other computer language source code, including Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS, and Stockdata.

In one embodiment, the tokens in the token database 68 are organized by content type. In other words, each possible content type has tokens associated with it. Furthermore, each token has a numerical weight associated with it. In one embodiment, the token analyzer 70 accesses the token database 68, and calculates a raw number associated with each content type by summing the weights of the tokens found in the object, counting each instance of tokens found more than once. The token analyzer 70 can then classify the object according to the content type with the highest numerical value.

In one embodiment, the tokens in the token database 68 are weighted differently as a function of their frequency and the strength of their association with the specific content type. For example, a common English language word will have a lower weight than a syntax that is highly specific to a certain programming language, such as C++, or other documentation language, such as Verilog.

In one embodiment, the token analyzer 70 assigns a confidence to its classification. For example, if the token summation for Verilog tokens present in an object is twice the total of other content type tokens, then the confidence in a Veriolog classification is relatively high. If, however, two or more content types have token sums that are closer together, the confidence that the content type with the highest token sum is the correct classification is lower. The confidence can be expressed numerically, by ranger, or as a percentage.

In one embodiment, the token analyzer 70 performs object classification using Bayesian statistics, which naturally indicate the probability of the correctness of the classification. For Bayesian analysis the token analyzer only needs to know which tokens are present in the object, but not how many times each token was observed in the object. Based on this input, Bayesian statistics can provide the probability of the object being each of the content types. The highest probability content type can be the classification received by the object.

The probability that the object is the classified content type provided by Bayesian statistics can be converted to, or used as, a confidence in the object classification. In one embodiment, where two (or more) content types are close in probability, both as stored in the content field of the tag, with the appropriate probabilities.

The various embodiments of the object classification method described above have been described in terms of functional modules carrying out the various actions required by each embodiment. However, the modular architecture shown in FIG. 7 is just one example architecture for implementing object classification. Thus, one embodiment demonstrating object classification without any specific architecture is now described with reference to FIG. 8.

Figure 8:
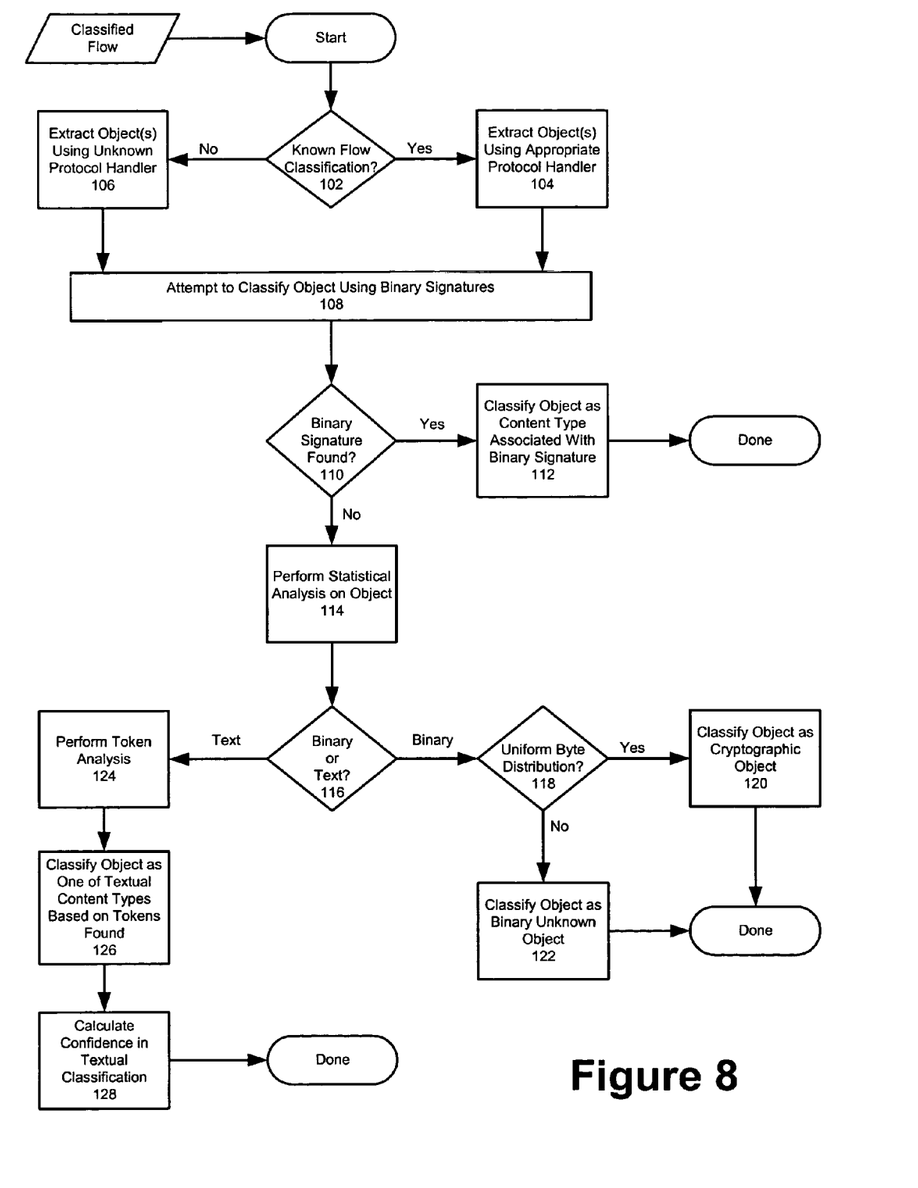
FIG. 8 is a flow diagram illustrating object classification processing according to one embodiment of the present invention.

The input for object classification remains the captured, assembled, and classified flow of packets. In block 102, a determination is made as to whether the protocol carrying the flow is known. If yes, then in block 104 the appropriate protocol handler associated with the known protocol (e.g., HTTP) is called to extract one or more objects from the flow.

If, on the other hand, the protocol is not determinable or unknown (e.g., an FTP data flow), then in block 106 the unknown protocol handler is called to extract the objects from the flow. In one embodiment, the unknown protocol handler outputs the entire flow as an object. In another embodiment the unknown protocol handler employs methods similar to those discussed with reference to object classification to extract objects from the unclassifiable flow.

In one embodiment, the unknown protocol handler traverses the unknown flow looking for statistically strong binary signatures. If a probable binary signature is found the object embedded in the unknown flow can be simultaneously extracted and classified based on the binary signature without a priori knowledge of the underlying protocol of the flow.

In one embodiment, the unknown protocol handler is configured to identify textual domains—also referred to as ASCII domains—which are regions of the flow identified by a strong ASCII statistical components. If a textual domain is identified in the unclassified flow, the token classification method described above may be employed to extract and classify the textual object content contained in the flow.

After one or more objects are extracted, processing can proceed object by object, or in parallel on a per object basis. In block 108, an attempt is made to classify the object using binary signatures, as set forth above. If in block 110 it is determined that a binary signature has been found, then the object is classified based on the binary signature in block 112 and the processing terminates.

On the other hand, if binary signature classification fails, then in block 114 statistical analysis is performed on the object. This can include, but is not limited to, byte analysis (e.g., how many times each possible byte occurred in the object), byte distribution analysis (e.g., how were the bytes distributed across the object), token presence analysis (e.g., what known tokens were found in the object), and token frequency analysis (e.g., how many times each token was found in the object).

In block 116 a decision is made as to whether the object is binary or textual in nature. For example, if ASCII character bytes occur more frequently than other bytes, the object may be determined to be textual in nature. However, if all bytes occur with approximately even frequency, then the object is probably binary. If the object is binary, then in block 118 a determination is made as to whether the byte distribution is uniform, based on the analysis performed in block 114.

If the distribution of the bytes throughout the object is uniform—defined for example as the variance or standard deviation of the bytes being below three sigma (3σ) or some other threshold—then the object is classified as a cryptographic object in block 120. In other words, the object is determined to include content that is encrypted by some cryptographic method, and the processing terminates. If, the byte distribution is found to be non-uniform (i.e., non-random), then the object is classified as a binary unknown object in block 122, and the processing terminates.

If, in block 116 the object was determined to be textual in nature, then token analysis is performed on the object in block 124. Token analysis can include calculating totals of token weights found in the object, performing Bayesian statistics of content types based on tokens present in the object, or any other token-based method of determining content type. Based on the calculations performed in block 124, the object is classified as some textual content type in block 126.

In block 128, the confidence of the classification of block 126 is calculated. The confidence may be based on a Bayesian statistic, an comparison of weight sums of other content types, or some other statistical method. The object classification processing then terminates. The object classification derived as a result of the processing can then be used to populate a tag describing the object, or can be associated with the object in some other way, e.g., in a database.

General Matters

In several embodiments, the capture system 22 has been described above as a stand-alone device. However, the capture system of the present invention can be implemented on any appliance capable of capturing and analyzing data from a network. For example, the capture system 22 described above could be implemented on one or more of the servers 14 or clients 16 shown in FIG. 1. The capture system 22 can interface with the network 10 in any number of ways, including wirelessly.

Figure 6:
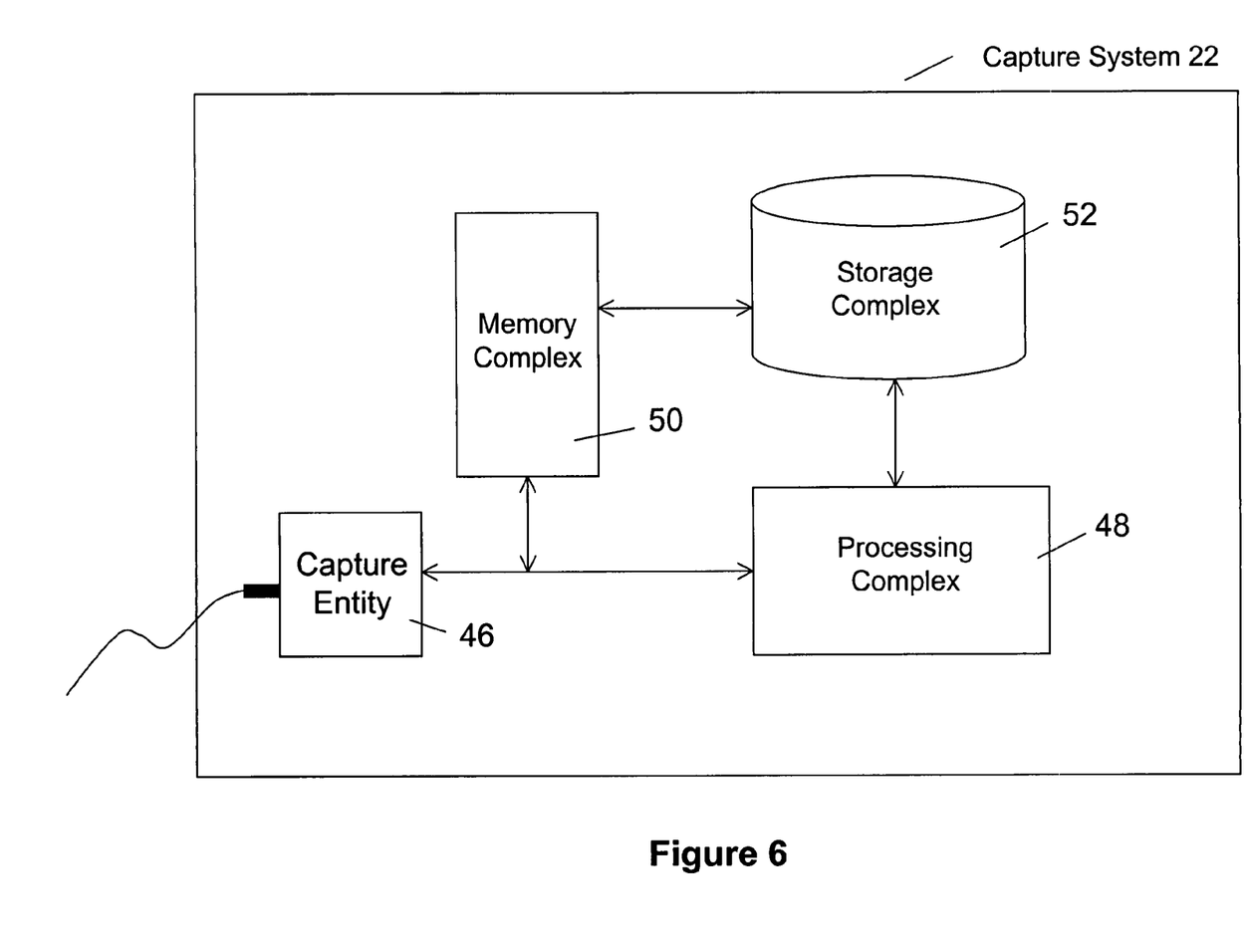
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means. In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Thus, a capture system and an object classification procedure have been described. In the forgoing description, various specific values were given names, such as "objects," and various specific modules, such as the "object statistics module" and "token database" have been described. However, these names are merely to describe and illustrate various aspects of the present invention, and in no way limit the scope of the present invention. Furthermore, various modules, such as the binary signature module 64 and the token analyzer 70 in FIG. 7, can be implemented as software or hardware modules, or without dividing their functionalities into modules at all. The present invention is not limited to any modular architecture either in software or in hardware, whether described above or not.

What is claimed is:

1. A method for classifying an object according to content comprising: determining whether the object is binary or textual in nature, wherein the object is captured and the captured object is a plurality of packets that are broken down by a capture system and then reassembled; classifying the object as one of a plurality of textual content types based on tokens found in the object if the object is determined to be textual in nature, wherein each of the tokens found in the object have an associated weight and the weights of the tokens are used to determine the content type of the object, and wherein a confidence level is assigned for classifying the content type of the object; and inserting the content type into a content field of a tag that indexes the object in a storage location and contains a plurality of fields to describe the object, wherein the capture system is configured to allow a document that includes the captured object to be forwarded from the capture system to its intended destination at a network node unless a capture rule prohibits forwarding the document based on the document including the captured object; and further classifying the object as an encrypted document based on a statistical characteristic of the object if the object is determined to be binary in nature, wherein the statistical characteristic of the object comprises a byte distribution of the object.

2. The method of claim 1, wherein classifying the object comprises generating a list of known tokens found in the object, each token being associated with a textual content type, calculating the probability of the object being each of the plurality of textual content types, and classifying the object as the textual content type with the highest probability.

3. The method of claim 2, wherein calculating the probability of the object being each of the plurality of textual content types comprises performing Bayesian statistics on the list of known tokens found in the object.

4. The method of claim 1, wherein the plurality of textual content types include Englishtext, Frenchtext, Germantext, Spanishtext, Japanesetext, Chinesetext, Koreantext, Russiantext, Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS, and Stockdata.

5. The method of claim 1, further comprising attempting to classify the object by searching for a known binary signature associated with a content type in the object.

6. The method of claim 1, wherein the object being textual in nature comprises the object containing ASCII text.

7. A method comprising: intercepting a flow; classifying the flow according to transmission protocol; extracting one or more objects from the classified flow using a protocol handler corresponding with the transmission protocol, wherein the objects are respective pluralities of packets that are captured and broken down by a capture system and then reassembled; classifying the one or more objects based on content type by statistically analyzing the object, wherein tokens found in the object have an associated weight and the weights of the tokens are used to determine the content type of the object, and wherein a confidence level is assigned for classifying the content type of the object; and inserting the content type into a content field of a tag that indexes the object in a storage location and contains a plurality of fields to describe the object, wherein a capture system that receives the captured object, which is part of a document, is configured to allow the document to be forwarded from the capture system to its intended destination at a network node unless a capture rule prohibits forwarding the document based on the document including one or more objects; and further classifying the object as an encrypted document based on a statistical characteristic of the object if the object is determined to be binary in nature, wherein statistically analyzing the object comprises determining a byte distribution.

8. The method of claim 7, wherein classifying the flow according to protocol comprises not recognizing a transmission protocol carrying the flow and classifying the flow as unknown; and wherein extracting one or more object comprises using a default protocol handler to extract the one or more objects from the unknown flow.

9. The method of claim 7, wherein the unknown protocol handler classifies the unknown flow as one object.

10. An apparatus comprising: an object statistics module to determining whether an object is binary or textual in nature, wherein the object is captured and the captured object is a plurality of packets that are broken down by a capture system and then reassembled; a token database to store a plurality of tokens, each token being associated with a textual content type, wherein each of the tokens found in the object have an associated weight and the weights of the tokens are used to determine the content type of the object, and wherein a confidence level is assigned for classifying the content type of the object; and a token analyzer to classify the object as one of the plurality of textual content types by accessing the token database if the object is determined to be textual in nature, wherein the content type is inserted into a content field of a tag that indexes the object in a storage location and contains a plurality of fields to describe the object, wherein the capture system is configured to allow a document that includes the captured object to be forwarded from the capture system to its intended destination at a network node unless a capture rule prohibits forwarding the document based on the document including the captured object; and wherein the object statistics module is configured to classify the object as an encrypted document based on a statistical characteristic of the object if the object is binary in nature, wherein the statistical characteristic of the object comprises a byte distribution of the object.

11. The apparatus of claim 10, the token analyzer is configured to classify the object by generating a list of known tokens found in the object, each token being associated with a textual content type, calculating the probability of the object being each of the plurality of textual content types, and classifying the object as the textual content type with the highest probability.

12. The apparatus of claim 11, wherein the token analyzer is configured to calculate the probability of the object being each of the plurality of textual content types by performing Bayesian statistics on the list of known tokens found in the object.

13. The apparatus of claim 10, wherein the plurality of textual content types include Englisthtext, Frenchtext, Germantext, Spanishtext, Japanesetext, Chinesetext, Koreantext, Russiantext, Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XO.uery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SO.L, RTSP, MIME, PDF, PS, and Stockdata.

14. The apparatus of claim 10, further comprising a binary signature module to classify the object by searching for a known binary signature associated with a content type in the object.

15. A non-transitory computer storage medium having stored thereon data representing instructions that, when executed by a processor of a capture system, cause the processor to perform operations comprising: determining whether a captured object is binary or textual in nature, wherein the object is captured and the captured object is a plurality of packets that are broken down by a capture system and then reassembled; classifying the captured object as one of a plurality of textual content types based on tokens found in the captured object if the captured object is determined to be textual in nature, wherein each of the tokens found in the object have an associated weight and the weights of the tokens are used to determine the content type of the object, and wherein a confidence level is assigned for classifying the content type of the object; and inserting the content type into a content field of a tag that indexes the object in a storage location and contains a plurality of fields to describe the object, wherein the capture system is configured to allow a document that includes the captured object to be forwarded from the capture system to its intended destination at a network node unless a capture rule prohibits forwarding the document based on the document including the captured object; and wherein the instructions further cause the processor to classify the captured object as an encrypted document based on a statistical characteristic of the captured object if the captured object is determined to be binary in nature, wherein the statistical characteristic of the captured object comprises a byte distribution of the captured object.

16. The non-transitory computer storage medium of claim 15, wherein classifying the captured object comprises generating a list of known tokens found in the captured object, each token being associated with a textual content type, calculating the probability of the captured object being each of the plurality of textual content types, and classifying the captured object as the textual content type with the highest probability.

17. The non-transitory computer storage medium of claim 16, wherein calculating the probability of the captured object being each of the plurality of textual content types comprises performing Bayesian statistics on the list of known tokens found in the captured object.

18. The non-transitory computer storage medium of claim 15, wherein the plurality of textual content types include Englishtext, Frenchtext, Germantext, Spanishtext, Japanesetext, Chinesetext, Koreantext, Russiantext, Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS, and Stockdata.

19. The non-transitory computer storage medium of claim 15, wherein the instruction further cause the processor to attempt to classify the captured object by searching for a known binary signature associated with a content type in the captured object.

20. The non-transitory computer storage medium of claim 15, wherein the captured object being textual in nature comprises the captured object containing ASCII text.

21. A non-transitory computer storage medium having stored thereon data representing instructions that, when executed by a processor of a capture system, cause the processor to perform operations comprising: intercepting a flow; classifying the flow according to transmission protocol; extracting one or more objects from the classified flow using a protocol handler corresponding with the transmission protocol, wherein the objects are respective pluralities of packets that are captured and broken down by a capture system and then reassembled; classifying the one or more objects based on content type by statistically analyzing the object, wherein tokens found in the object have an associated weight and the weights of the tokens are used to determine the content type of the object, and wherein a confidence level is assigned for classifying the content type of the object; and inserting the content type into a content field of a tag that indexes the object in a storage location and contains a plurality of fields to describe the object, wherein the capture system that receives the captured objects, which are part of a document, is configured to allow the document to be forwarded from the capture system to its intended destination at a network node unless a capture rule prohibits forwarding the document based on the document including the objects; and wherein the instructions further cause the processor to classify the captured object as an encrypted document based on a statistical characteristic of the captured object if the captured object is determined to be binary in nature, wherein statistically analyzing the object comprises determining a byte distribution.

22. The non-transitory computer storage medium of claim 21, wherein classifying the flow according to protocol comprises not recognizing a transmission protocol carrying the flow and classifying the flow as unknown; and wherein extracting one or more object comprises using a default protocol handler to extract the one or more objects from the unknown flow.

23. The non-transitory computer storage medium of claim 21, wherein the unknown protocol handler classifies the unknown flow as one object.

* * * * *